United States Patent Office 2,693,476
Patented Nov. 2, 1954

2,693,476

BETA-CARBONYL CARBOXYLIC ACID ESTERS OF STEROIDS

Lowell O. Cummings, Henry A. Vogel, and Alfred R. Bader, Milwaukee, Wis., assignors to Pittsburgh Plate Glass Company No Drawing. Application April 7, 1951,
Serial No. 219,899

14 Claims. (Cl. 260—397.2)

The present invention relates to methods of forming esters of sterols or steroid compounds containing free alcoholic hydroxyls and to the novel esters attained.

According to the present invention, a novel and useful class of esters has been produced. These compounds are esters of steroids containing free hydroxyls and a beta carbonyl carboxylic acid, such as acetoacetic acid. These esters may be prepared in high purity and in almost quantitative yield by interacting under mild conditions an ester of an enolizable beta carbonyl or beta keto carboxylic acid and a lower aliphatic alcohol containing, for example, up to 4 carbon atoms with a sterol.

Because of the high solubility of the lower alcohol in the reaction mixture, the concentration of such alcohol tends to increase as reaction proceeds. Where the reaction mixture contains the sterol and beta keto ester of the lower alcohol in essentially stoichiometric amounts, this accumulated lower alcohol adversely affects the yield and purity of the product. This difficulty may be overcome by removing the lower alcohol from the reaction mixture. This may be accomplished by evaporating the alcohol from the reaction mixture at atmospheric pressure. In some cases it may be desirable to remove the evolved alcohol under conditions such that the partial pressure of the lower alcohol vapor is less than atmospheric. This may be accomplished by conducting the reaction at a subatmospheric pressure, for example at an absolute pressure below about 0.75 atmosphere. Alternatively, or in conjunction therewith, the reaction mixture may be blown with an inert gas, such as nitrogen, carbon dioxide, etc., and preferably in the absence of water. In either case, the vapor of the lower alcohol will have a partial pressure less than atmospheric pressure.

The adverse effect of the lower alcohol also may be minimized by use of an excess, preferably a large excess of beta keto ester of the lower alcohol. By this means, the concentration of the lower alcohol is maintained low with respect to the original lower beta carbonyl ester. Thus for maximum yield it is advantageous to maintain the lower alcohol concentration below 33 mole percent of the beta keto ester of lower alcohol in the mixture and for most purposes, the lower alcohol concentration should be substantially below this value, for example, 5 mole percent or less.

It will be understood that all of the above features may be used individually or in conjunction with each other.

According to the present invention, excesses of the alcohol to be combined by interchange with the acetoacetic acid radical preferably are avoided because in such cases mixtures of the sterol and sterol ester are obtained. Separation of these may be laborious. Indeed, great excesses of the acetoacetic acid ester component may be employed and if care is exercised to eliminate, or at least sufficiently to reduce in the reaction zone the relative concentration of the lower alcohol generated by the reaction, to that of the initial beta keto ester, quantitative interchange of sterol radical can be attained.

Such reaction is attained merely by mixing the sterol with the beta carbonyl ester of the lower alcohol in the presence or absence of alcoholysis catalysts and diluents. In order to insure rapid reaction, the mixture is heated to a moderate temperature while eliminating the alcohol liberated by the interchange from the system.

The reaction involved, which occurs in liquid phase in the case of the monohydroxy sterols or steroids, may be represented by the equation:

EQUATION A

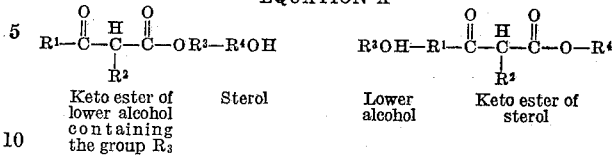

| Keto ester of lower alcohol containing the group $R_3$ | Sterol | Lower alcohol | Keto ester of sterol |

The several groups $R^1$, $R^2$, $R^3$, and $R^4$ will be defined later.

BETA CARBONYL ESTERS

Beta carbonyl esters which may be employed to effect esterification of the sterols and like compounds are carboxylic acid esters which contain a carbonyl group in the beta position with respect to an esterified carbonyl group. Such esters thus include the group

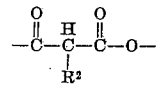

Such ester should contain no free carboxyl in the beta position with respect to a carbonyl group. The general structure of the esters may be represented by the formula taken from the above Equation A which is as follows:

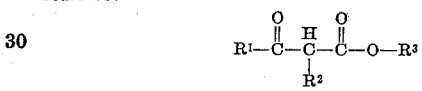

In the formula, group $R^1$ may be hydrogen, aliphatic, aromatic or aliphatic or aromatic groups containing substitute groups. Examples of such groups are: $CH_3$, $C_2H_5$

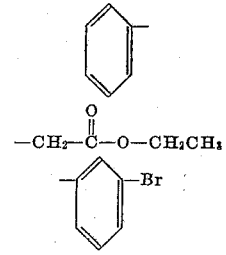

—$CH_2Cl$, —$C_2H_4Cl$, —$RNH_2$, —$RCHO$, —$OCH_3$, H, —OR, and other halogen substituted hydrocarbon radicals.

$R^2$ frequently is hydrogen but it can also be hydrocarbon or substituted hydrocarbon such as methyl, ethyl, propyl, butyl, benzyl, phenyl, chloromethyl or chloro, amino or the like derivatives thereof. Only one of the hydrogens of the alpha carbon atoms can be replaced by substituents. The remaining hydrogen atom is an active atom essential to the ester interchange reaction and must be retained.

$R^3$ is usually the labile radical which is adapted to be replaced in the ester interchange. These functioning groups usually are of low molecular weight, e. g., 1, 2, 3, or possibly 4 carbon atoms in a saturated or unsaturated aliphatic substituted or unsubstituted hydrocarbon chain.

Examples of appropriate beta carbonyl esters suitable for use in the practice of the invention include the following compounds:

Table A

Methyl, ethyl, n-propyl, isopropyl, butyl, allyl, methallyl, crotyl, propargyl, 2-chloroethyl, 2-fluormethyl, 2-nitropropyl esters of beta keto acids such as:

Acetoacetic acid
Acetyl acetoacetic acid
Alpha ethyl acetoacetic acid
Gamma chloro acetoacetic acid
Alpha methyl acetoacetic acid
Alpha isopropyl acetoacetic acid
Acetone dicarboxylic acid
Benzoyl acetoacetic acid
Alpha benzoyl acetoacetic acid
Acetyl succinic acid Benzoyl acetic acid
Diacetyl succinic acid
Chloro, iodo, and bromo substitution products of the above acids
Analogous esters of other beta carbonyl acids such as:
 Malonic acid diesters of the above alcohols
 Half acid chloride, half ester of malonic acid and the above alcohols
 Diesters of oxalacetoacetic acid of the above alcohols
 Half amid, half ester of malonic acid and the above alcohols.

The transesterification occurs with esters of acids which contain that base structure:

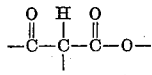

It has been found that a doubly substituted beta carbonyl ester that does not contain this structure and that contains no active hydrogen and being unable to enolize, gives no ester interchange with alcohols under the conditions of the present invention. Such an ester is methyl dimethyl acetoacetate of the formula:

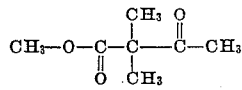

For most purposes esters of lower alcohols which boil or distill at a relatively low temperature for example 160° C. or below, at or below atmospheric pressure may be used most conveniently. However all esters of beta-keto acids which contain an active hydrogen produce the transesterification herein contemplated. Even where esters of alcohols which are difficult to distill off are used, the process is operative although separation of the evolved alcohol from the sterol ester thus obtained frequently becomes difficult.

The sterols are alcohols which may be isolated from the unsaponifiable residues of lipids derived from plant and animal sources. These compounds are of relatively high molecular weight containing from 17 to 30 or more carbon atoms. Sterols can be regarded as compounds containing or being derived from the cyclopentano-perhydro-phenanthrene ring structure and containing one or more e. g. two alcoholic groups. These alcoholic groups may be primary, secondary, or tertiary or any combination thereof. The ring structure may be completely saturated or may contain from 1 to 3 or more double bonds.

The sterols generally contain the following ring structure:

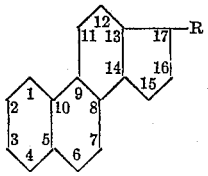

In the above structure, R may be H, OH, O straight chain or branched and either saturated or unsaturated hydrocarbon, or oxygenated or amino derivatives of the aforementioned hydrocarbons.

The above structure will contain one or more hydroxyl groups within the molecule appearing in either the ring or in a side chain or in both.

In addition a CH₃ group will generally appear at positions 10 and 13. (See Natural Products Related to Phenanthrene, Fieser & Fieser—Rienhold Publishing Corp.)

Closely related compounds which may be esterified according to this invention are the vitamins of the D group which usually are of the conventionalized formula:

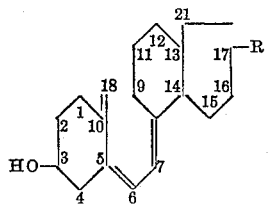

where the 7 carbon atom is dehydro, or double bonded. (See Chemistry and Physiology of the Vitamins, H. R. Rosenberg, 1945, Interscience Publishers, Inc., New York, page 341.) The preparation of beta keto esters of the vitamins of the D group is therefore regarded as being broadly embraced within the purview of the present invention. The sterols and the vitamins of the D group and related compounds may be represented by the formula:

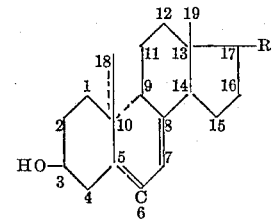

R being H, —O—H, O aliphatic hydrocarbon, or oxy derivatives or amino derivatives thereof and the bonds represented in broken line at 10—18 and 10—9 being alternative with respect to each other. Such compounds and their substituted equivalents or isomers are included within the term "sterol" as herein used. Obviously the epimers and hydration products may be employed as starting materials for treatment with lower alkyl esters of beta keto acids.

While many of the sterols are isolated from natural sources, the use of such compounds prepared by synthetic methods is contemplated herein.

These sterols or sterol-like compounds are often comparatively sensitive to high temperatures and/or other conditions. However, many of them are important starting compounds in the synthesis of hormones and other biologicals. Yet in some of the reactions to which the compounds are subjected it is desirable to protect the hydroxyl group from loss or from conversion to carbonyl form. It may also be desirable to convert the hydroxyl to ester form in order to increase the polarity of the compound or to provide reactive, or labile groups. By recourse to the present invention, the sterol or steroid compound may be esterified to produce the beta-keto ester. This ester may be treated to introduce other radicals or to change the structure of the compound and thereafter the beta-keto acid radical may be removed by hydrolysis to restore the hydroxy group to the modified steroid. The term "sterol" as used herein includes all hydroxylated steroids including vitamin D compounds.

Typical sterols or hydroxy steroids which may be employed according to this invention include:

Table B

Cholesterol
Beta sitosterol
Stigmasterol
Cholestanol
Epidehydroandrosterone
Ergosterol
Ergostane triol
Ergostadientriol
Strophanthidin
Lithocolic acid
Epicholestanol
Coprostanol
Steroid intermediates
Sterol sapoginins from various sources including dioscorea
Cortisone
Cholic acid
Desoxy cholic acid
Suprasterols
7 dehydrocholesterol
22 dehydroergosterol Triterpene alcohols such as:
 Agnosterol
 Lanosterol
 Lumisterol Other vitamins D such as:
 Vitamin D₅

Thus esters of sterols containing one, two, three, or more alcoholic hydroxyls may be prepared. When the sterols containing two or more alcohol hydroxyl groups are treated, partial esters or completely esterified sterols or mixtures thereof may be obtained. When these are produced as mixtures, they may be separated by crystallization, molecular distillation or other methods if desired.

CONDITIONS OF REACTION

It is feasible to prepare esters of beta keto carboxylic acids and sterols by moderately heating a lower ester of said acid, e. g., methyl or ethyl acetoacetate and said sterol or hydroxylated steroid in practically any proportions and under practically any reasonable conditions. In its broadest concepts the invention is considered to involve the preparation of the esters under practically any conditions of pressure or the like. However, if optimum yields of high grade product are to be obtained with least trouble and expense, the conditions should be chosen in accordance with the following principles:

The conditions of reaction employed to effect the ester interchange between the sterols and beta carbonyl esters such as beta keto esters may vary, dependent upon the carbonyl ester and the sterols employed in the reaction. However, the conditions should be relatively mild.

Catalysts of reaction are not required and usually it is desirable to operate without them. However, use of catalysts which promote alcoholysis reactions, such as sodium ethoxide and the like, may be used if desired.

The temperature of reaction should be sufficiently high to drive off the lower alcohol evolved by reaction. Preferably, it should be driven off substantially as fast as it is liberated in the reaction mixture. On the other hand, the temperature should also be below the point of decomposition of the reactants, or the desired product. A good average temperature is approximately 90 to 100° C. which is near that of an ordinary steam bath or even as high as 120° C. The temperature can also be reduced below this value. However, it is to be understood that as the temperature approaches or is reduced below the normal boiling point of the lower alcohol evolved in the system, it is desirable to apply vacuum in order to promote removal of the latter.

The temperature of reaction can be substantially in excess of 100° C. For example it can be as high as 150° C. but temperatures above 160° C. should not be employed if quantitative yields of the desired product are to be obtained. A range of 50° C. to 150° C. is therefore suggested for the ester interchange.

The approach of the upper limit of permissible temperature can usually be detected by a darkening of the reaction mixture. If any tendency so to discolor is observed, the temperature should be reduced until it ceases. It is usually preferred to employ a temperature above the boiling point of the lower alcohol evolved in the reaction mixture. This facilitates removal of the latter.

To obtain a very high yield of desired ester of the sterol, the concentration of the lower alcohol remaining in the system should not be allowed to rise much in excess of 33 molar percent with respect to the original amount of beta keto ester from which said alcohol is derived. It is generally desirable that the percentage be as much lower than this value as can reasonably be attained. If the concentration is reduced to 5 molar percent or even to 1 or 2 molar percent or less, still better yields can be attained.

Several methods are available to attain these low concentrations of the evolved lower alcohol without unduly increasing the temperature of the reaction mixture. For example, the system can be placed under fairly high vacuum thus stripping off the lower alcohol as it is formed while permitting the temperature to stay relatively low. In this way, the concentration of the original beta keto ester in the system is maintained. Such a system may be operated under such conditions that any beta keto ester vaporized is refluxed back into the reaction mixture while the evolved alcohol is removed.

It is likewise within the scope of this invention to strip off lower evolved alcohol by blowing the reaction mixture with a non-reactive gas, e. g., nitrogen, $CO_2$, or the like whereby a low partial pressure of vapors of evolved alcohol is maintained in the system. The effect is much the same as is obtained by subjecting the system to vacuum.

According to still another convenient method, the alcohol of reaction may be diluted by employing a high molar excess of the beta keto ester of the lower alcohol with or without distillation of the lower alcohol. For example, the excess may be 1 to 5, 10 or even 100 fold of the molecular ratio of the beta keto or carbonyl ester with respect to the original sterol undergoing ester interchange. The excess can be added initially or it can be added as the reaction proceeds.

Combinations of these several methods are contemplated. For example, an 0.1 to 100 mole excess of beta keto ester can be employed and at the same time, some or practically all of the alcohol of reaction can be removed as it is evolved, thus maintaining an extremely low percentage of the lower alcohol in the system. Such stripping may be effected by simple distillation at atmospheric pressure, by vacuum distillation or by blowing with non-reactive gas or vapor. Preferably stripping is effected in the absence or substantial absence of water. Usually, the higher the concentration of beta keto ester, the less thorough need be the stripping action.

In the event that complete conversion of the sterol or hydroxylated steroid to beta carbonyl ester is not desired, then quantities of original beta keto ester in less than equimolecular amounts in respect to the original sterol may be employed.

By properly reducing the concentration of the evolved lower alcohol in the system, it is possible to obtain yields of sterols of beta keto acids of 90% or higher up to practically quantitative values, e. g., 98 or 100%, without discoloration of the product or the reactants.

If care is observed to maintain the reaction temperature reasonably low and at the same time to distill off under vacuum or otherwise to remove, or decrease the concentration of the lower alcohol evolved by reaction, highly efficient ester interchange can be effected with equimolar ratios of the sterols and the beta keto ester of lower alcohol or with only a slight excess of the latter. However, it is usually more convenient to operate with an excess which is substantial, e. g., 10% or preferably larger (upon a molar basis) of the starting beta keto ester. This excess promotes the reaction. When the reaction nears completion, the excess of original ester can be removed. One method of removal of excess beta ester is by vacuum distillation at pressures of about 5 to 50, e. g., 15 millimeters of mercury. These pressures are usually satisfactory for distilling off this excess of beta keto ester but such other pressures as will remove the excess ester at permissible temperatures may be employed. The distillation may be conducted at or near the original reaction temperature. The distillation of the excess beta keto or beta carbonyl ester of lower alcohol is important if quantitative yields are desired because it also distills off any lower alcohol in the system, thus reducing the concentration of the latter with respect to the original beta keto ester still present and assuring that the ester interchange reaction is completed with respect to any residues of sterols still in the reaction mixture, at moderate temperatures.

In some instances, the sterol and the beta keto or beta carbonyl ester may not be sufficiently miscible in each other for satisfactory reaction. It is then desirable to include a non-reactive common solvent of the several components in the system. This should be added in an amount to effect solution of all components. The reaction conditions in other respects are maintained without substantial change. At the conclusion of the reaction, any solvents are distilled off.

Any solvent which has neutral solubility for both the sterol and beta keto or beta carbonyl ester and which is non-reactive to the reactants or their products may be employed. The following are representative of such solvents: benzene, toluene, xylene, ethyl acetate, chloroform, carbon tetrachloride, acetone, tetrahydrofurane, dioxane, and isopropyl ether.

In general the reaction is conducted at a temperature above about 50° C. At temperatures ranging from 50 to 150° C. or above, the reaction usually proceeds to substantial completion in about 3 to 48 hours. Where lower temperatures are used, for example room temperature or below, the reaction is much slower and several weeks may be required to achieve substantial reaction and even then use of a substantial excess of keto ester is generally required. Completion obviously can be determined by chemical analysis of the reaction mixture or by cessation of the evolution of the lower alcohol even though the temperature may be increased. Time should be afforded for completion of the reaction without undue rise of temperature. Maintenance of reaction conditions herein disclosed for any reasonable period after completion of the reaction is not particularly harmful.

It is likewise contemplated to employ as a source of sterols or steroid bodies for use in the practice of the invention various glyceride oil mixtures containing sterols in substantial amounts. For example, a soap stock which normally contains considerable amounts of sterols, such as cholesterol, may be treated with methyl or ethyl acetoacetate in accordance with the provisions of the invention to form esters of the keto acid in admixture with glycerides of fatty acids. The temperatures of reaction correspond to those herein disclosed. The conditions of reaction likewise in other respects, are similar to those of the examples as herein presented. Many other mixtures of fat-like products likewise include sterols which are susceptible of treatment in accordance with the provisions of the present invention.

Wool fat, for example, includes considerable amounts of cholesterol and it is contemplated to treat such cholesterol-containing material with an excess of ethyl or methyl acetoacetate at temperatures near the boiling point of water to form cholesterol esters in the mixture. These cholesterol esters can be recovered by solvents or by other appropriate methods.

Likewise, tall oil as obtained in the digestion of paper pulp is rich in sterols and notably in beta sitosterol. The distillation residue obtained after partial distillation of the rosin acids and fatty acids of tall oil is highly enriched in beta sitosterol. This crude mixture can be treated with methyl or ethyl acetoacetate to provide esters in admixture with rosin acids, fatty acids, and the other impurities of the tall oil residue.

Usually it is preferable to operate with more concentrated forms of the sterol or steroid compound. For example, beta sitosterol has heretofore been recovered from tall oil and tall oil distillation residues by solvent fractionation of crude tall oil. A convenient method of obtaining sterols, e. g., beta sitosterol, from tall oil or tall oil distillation pitches comprises esterifying the crude material with a lower alcohol, e. g., methyl alcohol, selectively to esterify fatty acids, contacting the mixture with countercurrently flowing streams of naphtha and furfural in a tower, separating off at one end a solution of furfural containing in solution a concentration of rosin acids and separating off at the other end, naphtha containing in solution an enrichment of esters of fatty acids and unsaponifiable material including beta sitosterol. The naphtha can be recovered by evaporation. The mixture of esters and unsaponifiable matter can be treated with alkali, e. g., caustic soda, to saponify the esters and the residual rosin acids in the mixture. The unsaponifiable matter is separated by dissolving the mixture in an aqueous alcohol, e. g., aqueous isopropyl alcohol and extracting out the unsaponifiable material in a solvent such as naphtha, and evaporating the naphtha. If purer sterols are desired, they can be recovered by crystallizing them from a solvent of sterols. In many cases, a relatively pure product has been obtained. The following examples illustrate the application of the principles of the invention in the preparation of beta keto esters of a crude or purified beta sitosterol.

*Example I*

Twenty grams of cholesterol and 100 grams of methyl acetoacetate were heated together in the absence of catalyst in a round bottom flask with open neck, at 90 to 100° C. Methyl alcohol was expelled as the reaction proceeded. At the conclusion of 8 hours, the excess of methyl acetoacetate was removed by vacuum distillation at a pressure of about 15 millimeters of mercury and there was obtained 23 grams of a white solid which had a melting point of 91 to 93° C. This product was dissolved in acetic acid and recrystallized to obtain a further purified compound melting at 93 to 94° C. The specific rotation $\alpha_D^{25°}$ in chloroform was $-33°$. The compound was cholesteryl acetoacetate of very high purity.

*Example II*

A mixture of 10 grams of cholesterol and 50 grams of ethyl acetoacetate was heated on a steam bath for 3 hours. The excess of ethyl acetoacetate was removed by distillation at a pressure of 10 millimeters (absolute). There remained 11 grams of a white solid which was identical with the product obtained in Example I, being cholesteryl acetoacetate. Saponification with alcoholic potassium hydroxide gave quantitative yields of cholesterol indicating the ester structure of the cholesteryl acetoacetate.

*Example III*

Two grams of stigmasterol and 20 grams of methyl acetoacetate were heated on a steam bath and under an air condenser, under which conditions the methyl alcohol was expelled as the reaction proceeded. Reaction was continued for two hours. At the end of this time, the excess methyl acetoacetate was stripped off by vacuum distillation. The vacuum was such as to maintain the temperature of distillation below 100° C. There remained 2.2 grams of a white solid which was crystallized from petroleum ether admixed with methanol to provide a product comprising white shining platelets of a melting point of 114 to 114.5° C., specific rotation $\alpha_D^{25°}$ in chloroform equals $-44°$. This product was stigmasteryl acetoacetate.

*Example IV*

Two grams of beta sitosterol having a melting point of 136 to 137° C. and 20 grams of ethyl acetoacetate were heated on a steam bath for 18 hours. The reaction product was stripped of ethyl acetoacetate and any residual ethyl alcohol by vacuum distillation and there remained a white solid product constituting 2.2 grams and this was recrystallized from petroleum ether admixed with methanol to provide a product in the form of white shining platelets of a melting point of 99° C. and of a specific rotation $\alpha_D^{25°}$ in chloroform of $-24°$. The product was beta sitosteryl acetoacetate. An identical product was obtained by use of methyl acetoacetate as the beta carbonyl ester.

*Example V*

One hundred milligrams of cholestanol melting in a range of 140 to 142° C. was treated with 10 grams of methyl acetoacetate by heating the mixture on a steam bath for 4 hours. Upon distillation of the excess of methyl acetoacetate, there remained a quantitative yield of cholestanyl acetoacetate in the form of white platelets of a melting point of 97° C. and of a specific rotation $\alpha_D^{25°}$ in chloroform of $+12°$.

*Example VI*

In this example, epidehydroandrosterone was admixed with a molar excess of methyl acetoacetate and heated on a steam bath for 18 hours. The excess of methyl acetoacetate was distilled under vacuum and there remained a solid product which was recrystallized from methanol to provide feathery white crystals of epidehydroandrosterone acetoacetate melting at 163° C. The specific rotation $\alpha_D^{25°}$ in chloroform was $+1°$.

*Example VII*

In this example, a non-reactive solvent was employed.
A mixture of 5 grams of cholesterol and 25 cc. of methyl acetoacetate in solution in 250 cc. of xylol (inert solvent) were heated on a steam bath and under an air cooled condenser designed to pass evolved methyl alcohol and to return reactives and solvents to system for 18 hours. At the conclusion of the reaction period, the methyl acetoacetate and the xylene were stripped by distillation under vacuum and there remained 5.9 grams of a white solid which after one recrystallization from aqueous acetic acid melted at 92 to 93° C. and which was identical with cholesteryl acetoacetate prepared without solvents as described in Example I.

*Example VIII*

In this reaction, ester interchange was effected between cholesterol and methyl acetoacetate. The reaction mixture comprised 10 grams of cholesterol and 100 cc. of methyl acetoacetate, the mixture being heated on the steam bath and at atmospheric pressure for 15 hours. During the reaction, inert gas was bubbled through the reaction mixture to effect the thorough removal of evolved methanol from the zone of reaction. Finally, the excess methyl acetoacetate was removed by vacuum distillation to yield 12 grams of a white solid cholesteryl acetoacetate of a melting point of 91 to 93° C.

*Example IX*

This example illustrates the employment of vacuum during the course of the ester interchange for purposes of more thoroughly removing the lower alcohol as it is evolved. In the reaction, 10 grams of cholesterol were admixed with 100° cc. of methyl acetoacetate and the mixture was heated upon the steam bath for 15 hours at a pressure of 40 millimeters of mercury (absolute). During the course of the reaction, methyl alcohol was evolved and distilled off and cholesteryl acetoacetate was formed. The yield and the purity of the product were practically identical with those obtained in Example VIII.

*Example X*

The use of esters of benzoyl-acetic acid, which are beta carbonyl compounds, in the transesterification has been referred to. In this example, 5 grams of cholesterol and 30 grams of ethyl benzoyl-acetate were heated at steam bath temperature for 20 hours. Removal of the unreacted ethyl benzoyl-acetate by vacuum distillation left 6.4 grams of cholesteryl benzoyl-acetate, which after crystallization from a butyl acetate-ethanol mixture melted at 151° C.

The sterol esters of beta carbonyl acids are in general crystalline solids, many of which melt readily at elevated temperatures, for example 90–125° C.

The acetoacetates and like beta-keto and beta carbonyl esters of sterols, in general, possess greater solubility than the parent sterol, as well as greater solubility than such conventional sterol esters as acetates or benzoates. Consequently these sterol esters are useful intermediates in steriod syntheses because of greater ease of handling in solutions for purposes of crystallizing or of conducting other synthetic reactions on solutions. For example, in the following table are given the comparative solubilities of cholesteryl acetoactate and cholesteryl acetate in a number of solvents. The volume of each solvent in cc. or milliliters required to dissolve 1 gram of the cholesteryl ester at reflux temperature is given.

|  | Cholesteryl Acetate, ml. | Cholesteryl Acetoacetate |
|---|---|---|
| Acetone | 3 | Less than 1 ml. |
| Methanol | 70 | 20 ml. |
| Methanol and Hexanol (Equal Volumes) | 13 | Less than 2 ml. |
| Methanol and Isopropyl Ether (Equal Volumes) | 9 | Do. |
| Methanol and Acetone (Equal Volumes) | 17 | Do. |

(ml.=milliliters.)

This increased solubility of a sterol derivative is of particular advantage when purifying such materials by solvent crystallization since the volume of solvent required to dissolve the sterol derivative is from ⅓ to ⅙ as large when using the acetoacetate rather than the acetate of the sterol.

It is well known that beta-keto acids and their esters are metabolic intermediates in living organisms. Compounds such as acetoacetic esters and acetone dicarboxylic esters have been isolated as products of metabolism. Esters of beta-keto acids and sterols, therefore, are considered to be metabolic intermediates and may have therapeutic value.

*Example XI*

2.0 grams of cholesterol, 8 grams of ethyl acetonedicarboxylate $C_2H_5OOC-CH_2COCH_2COOC_2H_5$ and 10 milliliters of toluene were heated on a steam bath for 20 hours, the evolved ethanol being distilled off. The toluene was then removed by distillation in vacuo and the oily residue was triturated with acetone to precipitate a white solid, dicholesteryl acetonedicarboxylate. This material after one crystallization from a mixture of methanol and isopropyl ether was a solid which melted at 173° C. The acetone filtrate on evaporation to dryness left an oil, ethyl cholesteryl acetonedicarboxylate which could not be obtained crystalline.

*Example XII*

10 grams of cholesterol and 100 grams of diethyl acetyl succinate $C_2H_5OOC-CH_2CH_2(COCH_3)COOC_2H_5$ were heated on the steam bath under a 10 millimeter absolute pressure for 64 hours. 93.5 grams of unreacted lower beta-keto ester was then removed by distillation in vacuo, and the residue was dissolved in 50 milliliters of ethanol, cooled and the white solid filtered, washed with 100 milliliters of ethanol and dried. The product was a solid which consisted largely of cholesteryl ethyl acetyl succinate.

*Example XIII*

57 milligrams of cortisone and 50 milliliters of methyl acetoacetate were heated on a steam bath for 16 hours. The unreacted methyl acetoacetate was then removed by distillation in vacuo, and the residue on crystallization from aqueous ethanol yielded shiny platelets of cortisone acetoacetate which melted at 112–114° C.

*Example XIV*

3.87 grams of cholesterol and 23.22 grams of methyl acetoacetate were heated with 101.2 milligrams of triethylamine at 98° C. for 4 hours, using a water condenser. The 50.0 milliliters of methanol was added, the solution was cooled overnight at 23° F., the white solid was filtered, washed with 50 milliliters methanol and dried. The product was cholesteryl acetoacetate.

*Example XV*

The process of Example XIV was repeated but substituting 98.0 milligrams of concentrated sulfuric acid for the triethylamine. The product was cholesteryl acetoacetate.

*Example XVI*

The process of Example XIV was repeated but substituting 38.6 milligrams of sodium cholesterate for the triethylamine. The product was cholesteryl acetoacetate.

*Example XVII*

The process of Example XIV was repeated but substituting 185 milligrams of benzene sulfonic acid hydrate for the triethylamine, and heating the reaction mixture at 98° C. for 3 hours. The product was cholesteryl acetoacetate.

*Example XVIII*

3.87 grams of cholesterol and 23.22 grams of methyl acetoacetate were heated at 140° C. with a water condenser for 5 hours. Then 50 milliliters of methanol was added, the solution was cooled overnight at 23° F., and the white solid was filtered, washed with 50 milliliters methanol and dried. The product melted at 94.5–95.5° C. and was substantially pure cholesteryl acetoacetate.

*Example XIX*

The process of Example XVIII was repeated at a temperature of 160° C. rather than 140° C. The product melted at 90–91° C. and was cholesteryl acetoacetate but was slightly less pure than the product of Example XVIII.

While the above examples are directed to the production of the sterol acetoacetates by ester interchange reaction, it is to be understood that these esters may be prepared by esterification by reaction of the sterol with diketene.

The beta carbonyl esters of sterols and hydroxylated steroids are generally solids which crystallize readily and which melt at temperatures usually ranging from 30–125° C. A few of these esters are liquids. These esters may be used as intermediates for production of a wide variety of sterol derivatives and modified sterols. Thus, these esters may be treated according to the following groups of reactions:

(A) Reactions with the radical of the beta carbonyl or beta-keto acid.

(B) Reaction with the sterol or steroid radical ($R_4$).

Each of these are considered below.

According to this invention, modified sterols or steroids may be produced in a convenient manner using the esters of beta-carbonyl or beta-keto acids as intermediates. Prior to the present invention, it has been common to prepare derivatives of sterols or modified sterols by preliminarily blocking off the hydroxyl group by esterification, and subsequently preparing the derivative. In such a case, it is common to esterify the sterol with acetic anhydride to produce the acetate. This sterol acetate is then subjected to treatment to modify the sterol radical. For example, the sterol radical may be oxidized, halogenated, or halogenated and thereafter oxidized in order to produce modified compounds. Following these reactions, the acetate group is hydrolyzed off and a modified sterol is thus obtained.

As a typical example, cholesterol has been reacted with acetic anhydride in order to produce the corresponding acetate. This product is then reacted with bromine to protect the double bond. The resulting product is then oxidized with chromic acid or like oxidizing agent to remove the side chain. Thereafter, the resulting oxidized product is debrominated and reacted with semi-carbazide to precipitate the semi-carbazone from solution. Following this, the product is hydrolyzed to remove the semi-carbazide and acetate groups, with the resulting production of dehydroepiandrosterone. In some cases it may be desirable to hydrolyze the acetate grouping to form the free alcohol prior to the preparation of the semi-carbazone. The reactions involved in such process are indicated to be as follows:

yield 110 grams of pure cholesteryl acetoacetate. This ester is dissolved in 1 liter of carbon tetrachloride and a solution of 115 grams of bromine in 1 liter of petroleum ether is added slowly with agitation, keeping the reaction mixture at a temperature of 15–20° C. Evaporation of the solvent leaves tetrabromo cholesteryl acetoacetate. This acetoacetate may be oxidized according to standard methods used for oxidizing the corresponding acetate such as described in United States Letters Patent Nos. 2,464,236, 2,244,968, 2,323,584 or according to other methods such as described in Fiat Final Report No. 996 entitled "The Commercial Development and Manufacture of Synthetic Hormones in Germany," published January 29, 1947, by the Technical Intelligence Division U. S. Department of Commerce. In such a case the stoichiometric amount

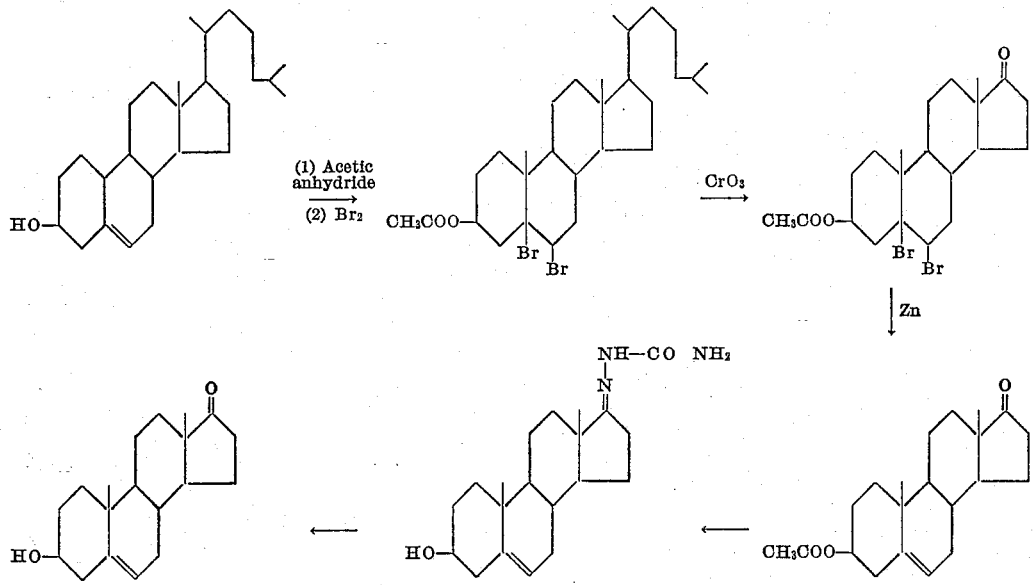

According to the invention of two of us the beta-keto esters of sterols may be prepared and these esters subjected to the treatment for the production of sterol oxidation products or other modifications of the sterol radical. Substantially higher yields of products may thus be obtained. Following this, the acetoacetate group or like beta carbonyl group may if desired be hydrolyzed off with consequent regeneration of the sterol.

The following are typical examples which are generally applicable to this embodiment.

*Example XX*

100 grams of cholesterol are transesterified with 1000 milliliters of methyl acetoacetate as described above to of the acetoacetate or other beta-keto ester or beta carbonyl ester is substituted for the corresponding sterol acetate. Thus cholesterol acetoacetate or like sterol acetate may be oxidized with chromic acid in a mixture of glacial acetic acid and concentrated sulfuric acid, keeping the reaction temperature at 15–20° C. The reaction mixture is then filtered to remove the chromium salts, debrominated with zinc dust, hydrolyzed with aqueous sodium hydroxide and extracted with benzene. Evaporation of the benzene in vacuo leaves a brown oil which is treated with semicarbazide hydrochloride and sodium acetate to isolate the semicarbazone of epidehydroandrosterone in the conventional manner.

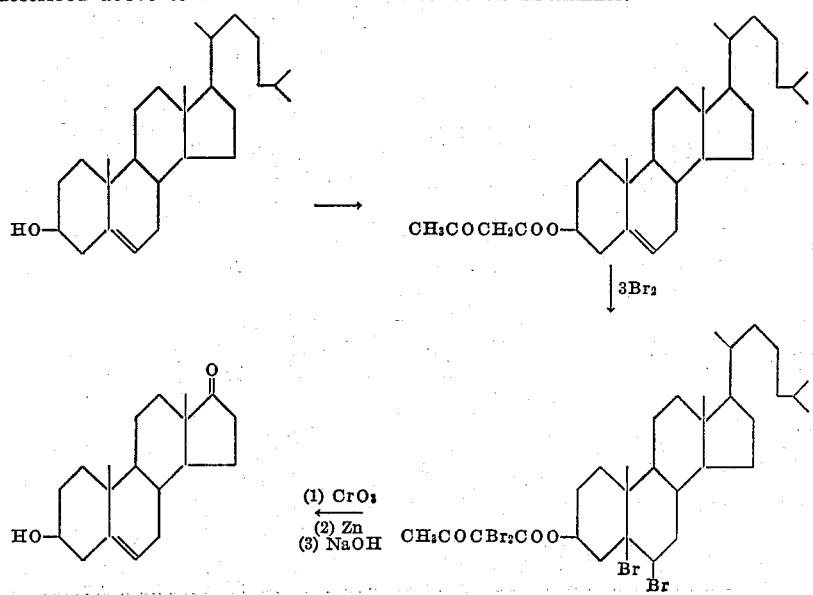

Sterol acetoacetates may be treated according to other methods for production of modified sterols. Thus Testosterone or Proluton C may be prepared from Trans-Dehydroandrosterone acetoacetate, Desoxy corticosterone acetoacetate from 3-acetoacetoxy cholenic acid, Progesterone from Soya-Phytosterol and other sterol derivatives prepared by substituting the corresponding acetoacetates or like beta-keto esters or beta carbonyl esters in lieu of the acetates in the processes disclosed in the above mentioned Fiat Report No. 996.

This reaction is illustrative of but one of many series of reactions which may employ beta-carbonyl esters of sterols as intermediates. Other similar reaction schemes include the oxidation of stigmasteryl acetoacetates or other beta-keto esters of stigmasterol to hydroxybisnorcholenic acid and thence to pregnenolone and progesterone, also via beta-carbonyl derivatives. Similarly, a beta-keto ester of sitosterol such as sitosteryl acetoacetate may be oxidized to epidehydroandrosterone by the series of reactions above indicated. Similarly beta-keto esters of cholesterol may be oxidized with potassium permanganate to progesterone and other oxidation products.

According to a further embodiment, polyhydroxy sterols may be reacted to esterify but one or a portion of the hydroxyls of the sterol. Such a partially esterified sterol may be subjected to oxidation to oxidize the remaining hydroxyl group or groups to ketone groups, or to effect a cleavage of the ring.

*Example XXI*

40 grams of cholic acid may be heated with 12 grams of methyl acetoacetate in 200 milliliters of xylene under partial vacuum at 100° C. for 24 hours. The xylene is then removed by distillation and the resulting product is largely 3-acetoacetoxy-7,12-dihydroxycholanic acid. This product may be oxidized in the following manner:

*Example XXII*

3-acetoacetoxy-7,12-dihydroxycholanic acid ethyl ester (prepared by the Fischer esterification of the acid) may be oxidized with potassium chromate in acetic acid in the presence of sodium acetate to yield a mixture of the ethyl esters of 3-acetoacetoxy-7-keto-12-hydroxycholanic acid and 3-acetoacetoxy-7,12-diketocholanic acid. This may be represented by the equation teryl acetoacetate, may be reacted with hydroxylamine hydrochloride with consequent production of the corresponding oxime according to the following equation:

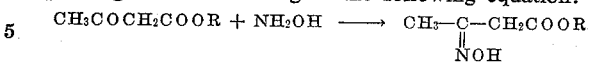

where R is a sterol radical.

Similarly hydrazine and substituted hydrazines react with consequent production of the corresponding hydrazones, of which the following equation is typical.

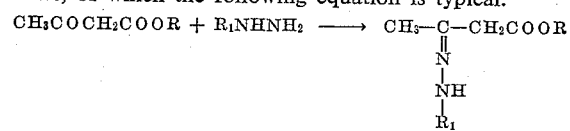

where R is the sterol radical and $R_1$ the radical of the hydrazine. The following examples are illustrative.

*Example XXIII*

One gram of cholesteryl acetoacetate is dissolved in 10 milliliters of ethanol, and the solution is heated to approximately 65° C. To this hot solution, one gram of semicarbazide hydrochloride and 1.5 grams of sodium acetate are added. The solution is heated for 5 minutes. Upon cooling, the semicarbazone of cholesteryl acetoacetate crystallizes. This example is typical of the type of reactions which occur between semicarbazide and the above described acetoacetate and other beta-keto or beta carbonyl esters of sterols generally. These compounds are, in general, crystalline in character and may be used in the production of other intermediates or as pharmaceuticals.

*Example XXIV*

To a solution of 1 gram of cholesteryl acetoacetate in 10 milliliters of ethanol, 1 gram of phenyl hydrazine and one drop of acetic acid is added, and the solution is warmed on the steam bath for five minutes. Cholesteryl acetoacetate phenylhydrazone crystallizes on cooling, and may be recovered on filtration. This reaction is typical of the reaction of sterol beta-keto and beta carbonyl esters with hydrazine and substituted hydrazines.

According to a further embodiment, the beta-keto esters of sterols may be reacted with ammonia or pri-

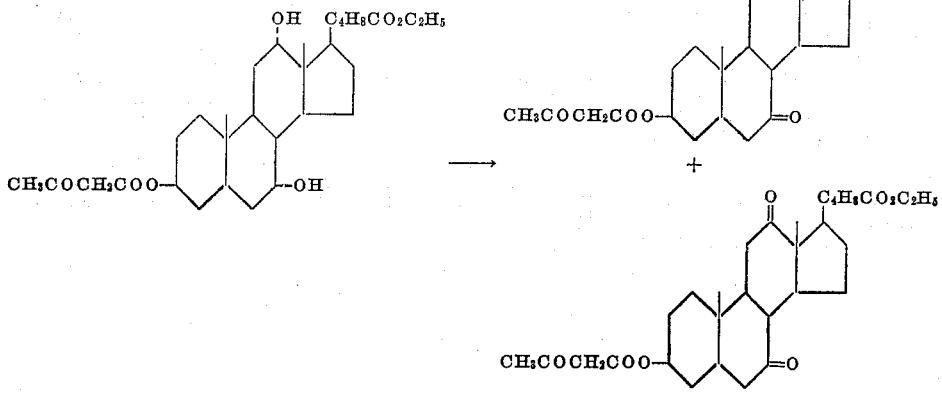

According to further embodiments of the invention, a wide series of compounds may be prepared by subjecting the sterol ester to a treatment involving modification of the beta-keto or beta-carbonyl radical.

Thus beta-keto esters containing one or more active hydrogen atoms will in addition to the normal ester type reactions, have reactivity in the following manner:

(1) Reactions involving the carbonyl group directly
(2) Reactions involving the enolic hydroxyl group, and
(3) Aeactions due to the activation of the

or —CH₂ groups between the carbonyls.

The following are typical examples of these reactions. A sterol ester of a beta-carbonyl acid, such as cholesmary or secondary amines, including those containing up to 18 carbon atoms in a carbon radical linked to the amino nitrogen, with consequent production of beta-amino crotonic esters of sterols. The following is a typical example.

*Example XXV*

10 grams of beta-sitosteryl acetoacetate may be dissolved in 100 milliliters of ethanol to which a crystal of ammonium acetate is added. Anhydrous ammonia is then bubbled through this solution. An exothermic reaction occurs and ammonia introduction is continued until a substantial excess of ammonia over theoretical has been introduced or at least so long as heat is evolved. After heat ceases to be evolved, the beta-sitosteryl-beta-amino crotonate is precipitated by addition to the reaction mixture of a concentrated solution of sodium chloride. This example is typical of examples which may be used in treatment of beta-carbonyl esters of sterols and steroid compounds for production of the corresponding beta-amino crotonate esters. Such compounds may be used as intermediates in production of other compositions as well as for pharmaceutical purposes.

As has been previously explained, the sterol esters of beta-carbonyl acids may be reacted with halogen. In such cases, the halogen, such as bromine or chlorine, reacts with the beta-keto acid radical according to the following general formula:

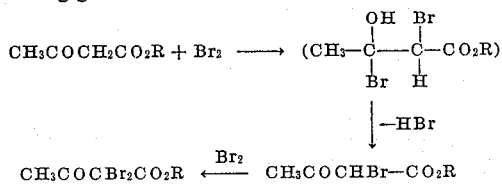

In many cases, this bromination or chlorination also results in addition of the halogen to a double bond in the sterol radical, if such double bond is present.

According to a further embodiment of the invention, the beta-keto or beta-carbonyl esters, particularly sterol esters of beta-keto acids, may be condensed with aldehydes, such as formaldehyde, acetaldehyde, acrolein, crotonaldehyde, benzaldehyde, and like aldehydes preferably containing not more than 6 carbon atoms, according to the following general reaction:

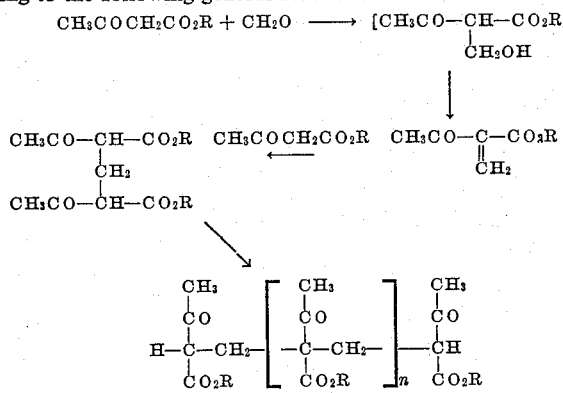

From this formula, it will be apparent that both dimers and polymers containing a plurality of ester units may be produced. The above formula, of course, applies when an acetoacetic ester is treated with formaldehyde. It will be understood that corresponding reactions occur when other aldehydes are used, as above described, and also when other beta-keto or beta-carbonyl esters are used.

The above described reactions are simply typical of the uses to which the beta-keto or beta-carbonyl esters of sterols may be put as intermediates. It will, of course, be understood that inasmuch as such esters contain a beta-keto or beta-carbonyl group, such esters may be subjected to all of the general reactions which may be applied to the treatment of beta-keto esters.

Although the present invention has been described with reference to the specific details of certain embodiments thereof, it is not intended that such details should be regarded as limitations upon the scope of the invention except insofar as included in the accompanying claims.

What is claimed:
1. An ester of a sterol and an acid of the group consisting of acetoacetic acid, benzoylacetic acid, acetonedicarboxylic acid, and acetylsuccinic acid.
2. A sterol acetoacetate.
3. An acetoacetate of a sterol which contains a single alcoholic hydroxyl group.
4. Cholesteryl acetoacetate.
5. Cortisone acetoacetate.
6. Beta-sitosteryl acetoacetate.
7. Stigmasteryl acetoacetate.
8. Epidehydroandrosteryl acetoacetate.
9. A method which comprises reacting a sterol which contains an alcoholic hydroxyl group with an acetoacetic ester of a lower monohydric alcohol containing up to 4 carbon atoms.
10. A method which comprises heating a liquid mixture of an hydroxylated sterol with an acetoacetate of another hydroxy compound.
11. A method of forming an ester of a sterol containing one hydroxyl group, which group is in position 3, which comprises heating to a temperature below 160° C. a mixture of said sterol and an alkyl ester of acetoacetic acid in which the alkyl groups contain one to two carbon atoms.
12. The method of claim 11 in which the sterol is cholesterol.
13. The method of claim 12 in which the reaction is conducted in the presence of a stoichiometric excess of the acetoacetic acid ester, and in the absence of catalysts of ester interchange.
14. The method of claim 13 in which the reaction is conducted with concurrent removal of lower alcohol containing 1 to 2 carbon atoms substantially as it is formed.

References Cited in the file of this patent
UNITED STATES PATENTS

| Number | Name | Date |
|---|---|---|
| 2,295,980 | Weisz | Sept. 15, 1942 |
| 2,533,015 | Jasion | Dec. 5, 1950 |

FOREIGN PATENTS

| Number | Country | Date |
|---|---|---|
| 592,421 | Great Britain | Sept. 17, 1947 |

OTHER REFERENCES

Page: Biochem. Zeit 220, pp. 304–26, (1930).
Shriner and Fuson: The Systematic Identification of Organic Compounds, 3rd ed., 1948 pp. 167–8, 201–2, 262–5.